United States Patent [19]

Egly et al.

[11] Patent Number: 5,040,766

[45] Date of Patent: Aug. 20, 1991

[54] ADJUSTABLE PRINTER STAND

[75] Inventors: Robert A. Egly, 31 Belcourt South, Newport Beach, Calif. 92660; Patrick Sullivan, Orange, Calif.

[73] Assignee: Robert A. Egly, Newport Beach, Calif.

[21] Appl. No.: 529,464

[22] Filed: May 29, 1990

[51] Int. Cl.[5] .............................................. F16M 13/00

[52] U.S. Cl. ....................................... 248/670; 211/13; 248/676; 248/918; 248/924

[58] Field of Search ............... 248/165, 670, 676, 924, 248/675, 678, 639, 637, 918; 211/13, 26

[56] References Cited

U.S. PATENT DOCUMENTS

D. 307,084 4/1990 Currie ............................ 248/676 X
4,790,432 12/1988 Rees ............................ 248/223.4 X
4,938,447 7/1990 Schriner ......................... 248/676 X

OTHER PUBLICATIONS

Demco Universal Printer Stand, Demco, Madison, WI, 1-1988, p. 517.

*Primary Examiner*—David L. Talbott
*Attorney, Agent, or Firm*—George F. Bethel; Patience K. Bethel

[57] ABSTRACT

A printer stand for support of a printer having a pair of spaced apart parallel bars which are supported by stanchions. A pair of spaced apart cantilever support arms having cross members for bracing are detachably secured to the stanchions. A paper catch tray is detachably mounted on and supported by the cantilever support arms. The height and width of the printer stand are adjustable to accommodate different sizes of printers.

12 Claims, 4 Drawing Sheets

FIG. 1
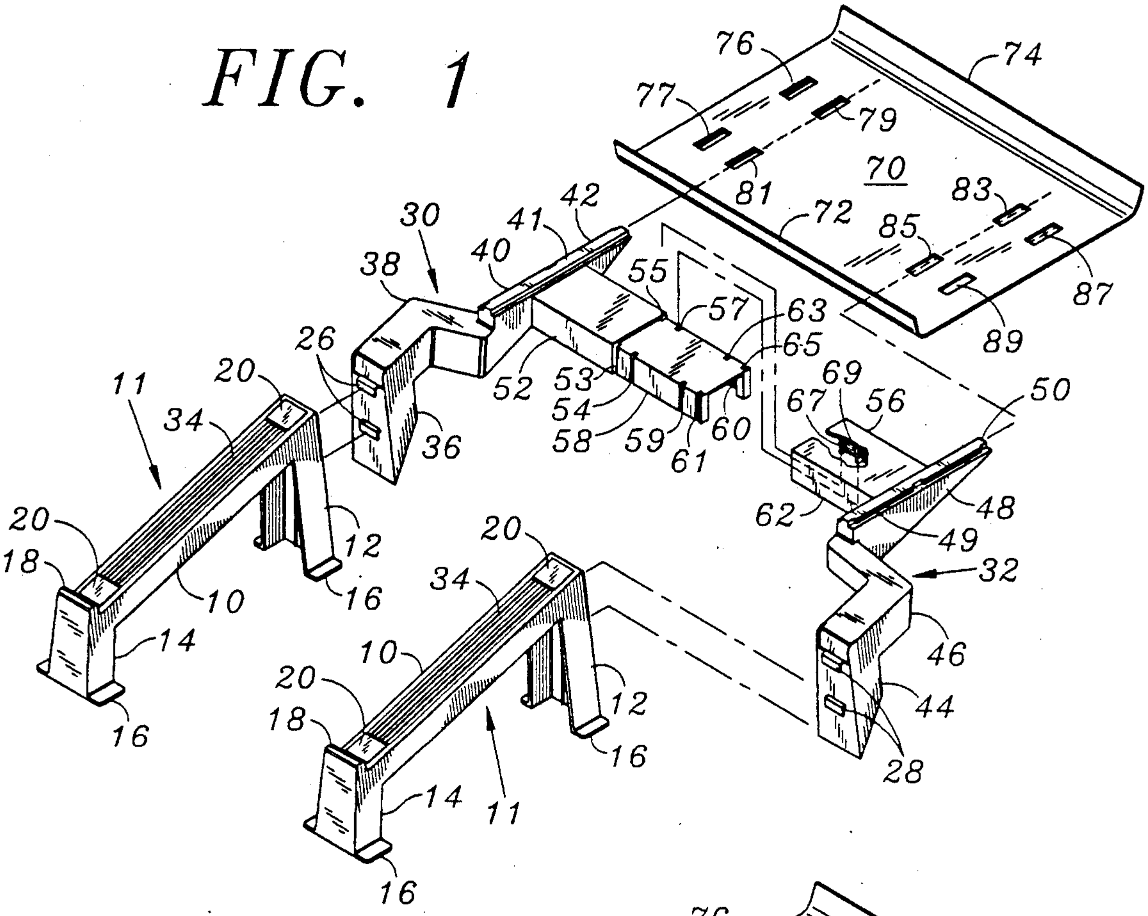
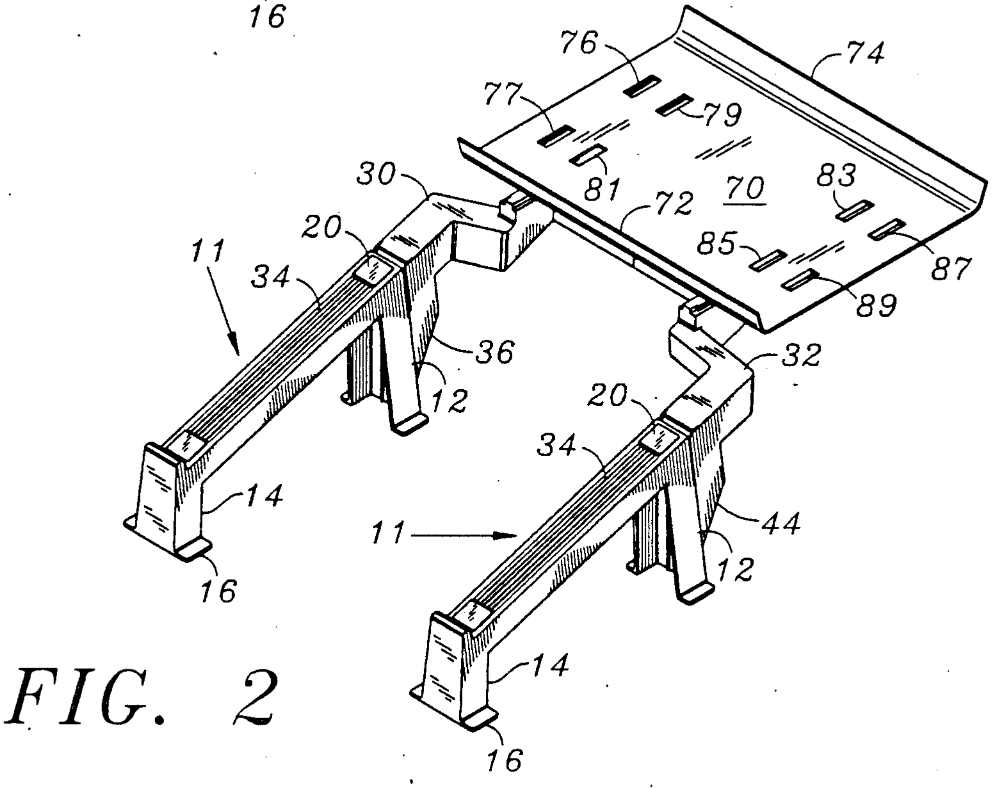
FIG. 2

ADJUSTABLE PRINTER STAND

FIELD OF THE INVENTION

This invention relates to the field of printer stands and particularly to an adjustable printer stand which will accommodate different sizes of printers and which is easily assembled and disassembled by hand without the need for tools. A tray for printed material is also provided which can be adjusted to varying heights.

DESCRIPTION OF THE PRIOR ART

The prior art with regard to desk top printer stands has comprised a number of various designs. These have mainly comprised a fixed closed sided box with space beneath the stand for paper. Some designs include one or more slots in the surface upon which the printer rests for insertion of the feed paper. Others include an attached forms catcher for receiving the output of the printer.

These printer stands mainly suffer from a lack of adjustability in height or width or in the capability of accommodating various size printers. Still others do not provide the stability necessary to handle the vibration which is generated especially by a Dot Matrix Printer. The various designs sometimes contribute to bunching of paper and interference with paper feed so that the paper jams within the printer. Others do not provide sufficient space beneath the printer for adequate amounts of paper. Moreover, those with a paper catcher tray are often located so that they interfere with the feeding of the paper or do not hold sufficient amounts of paper to be practical. In other instances the paper catcher tray must be supported by the desk or other surface upon which the printer stand rests. This does not permit the printer stand to be utilized so that the paper catcher tray extends outwardly from the desk or other surface.

SUMMARY OF THE INVENTION

The desk top printer stand of the invention is comprised of a pair of parallel bars supported at the ends of each bar by stanchions. Preferably one stanchion of each bar is taller than the other stanchion to provide an overall slant or slope to the printer support surfaces of the bars. The taller stanchions are preferably provided with apertures for receipt of hooked tab members. The hooked tab members are adhered to upright support members for support of a locking beam structure including support arms each having a cross member which adjustably interlocks with a corresponding cross member of another support arm. Each of the arms attached to corresponding upright support members are provided with a rail having a side opening slot which receives an inwardly turned flange on a paper catch tray in a sliding relationship.

All of the respective parts of the desk top printer stand are easily connected by hand requiring no tools for assembly or disassembly. The desk top printer stand is preferably made of a strong lightweight plastic material. The presence of the upright support members, support arms and cross members not only support the paper catch tray but also add crosswise stability to the stanchions which support the printer.

The upright support members with the support arms are adjustable as to the width between them by means of the cross members so that different sized printers can be accommodated.

Moreover, the upright support members which interlock with the apertures on the stanchions have adjustable positions to provide adjustable height to the support arms so that more or less paper can be received by the output tray.

With the exception of the stanchions, the printer stand is entirely open so that the printer is raised from the surface of a desk or other surface for storage of feed paper. Also, the open design on all sides allows for easy access to the feed paper and at the same time allows for back and bottom paper feed.

The preferred provision of one tall stanchion and one short stanchion angles the printer toward the user so that there is visual access to the material being printed as well as to the feeding of the paper into the printer.

The paper catch tray is also large enough to accommodate standard and extra wide paper. The paper is neatly stacked as it is received in the paper tray. Also, the paper tray can be lowered for holding more paper by repositioning the upright supports on the stanchions.

In order to protect the desk surface, the printer stand is provided with rubber cushions under the stanchions and rubber cushioning on the printer contact surfaces of the bars. This effectively dampens vibration as well as noise and more safely secures the printer to the stand.

The cantilevered construction of the upright support member and support arms for support of the paper catch tray is also unique. Moreover, the paper catch tray is a very rigid strong tray compared to the mesh baskets of the prior art. This enables more paper to be held by the paper catch tray without fear of collapse.

BRIEF DESCRIPTION OF THE DRAWINGS

FIG. 1 shows a perspective broken away view of the printer stand of the invention.

FIG. 2 shows a perspective view of the printer stand in its assembled form.

DETAILED DESCRIPTION OF THE DRAWINGS

Figure 3:
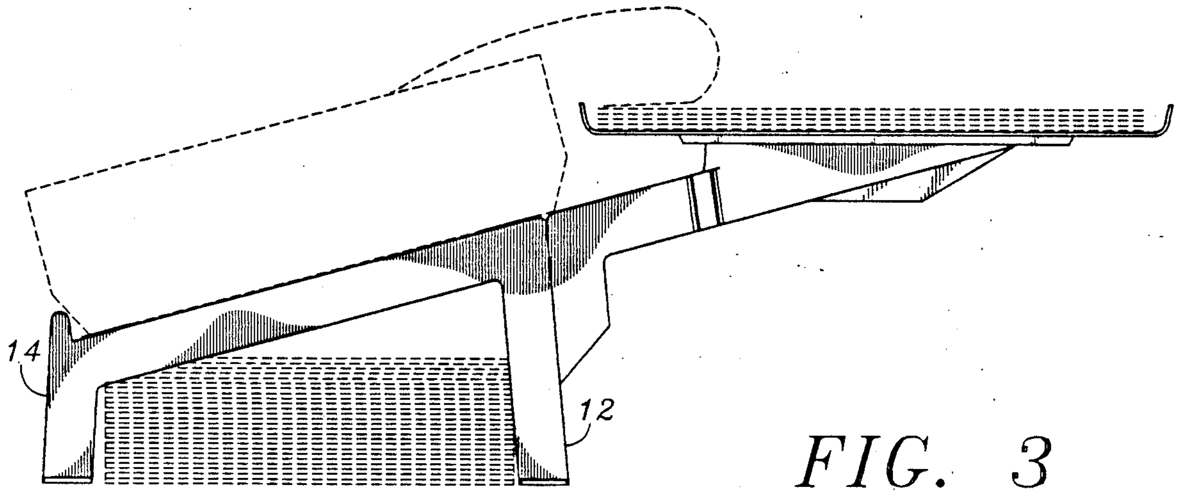
FIG. 3 shows a side view of the printer stand of the invention with outlining for a printer and for the path of the paper as it is expelled from the printer and received on the paper catch tray.

As shown in FIG. 1 the printer stand includes a pair of bars 10 which are supported by stanchions 12 and 14. The base of each of the stanchions 12 and 14 is flared outwardly to form feet 16. The bar 10 and stanchions 12 and 14 are of open channel construction.

Stanchion 14 includes an upwardly projecting shoulder 18 against which the printer is seated. The bar 10 which extends between the stanchions 12 and 14 is angled due to the greater height of stanchion 12. The angle not only permits the operator to see the text as it is being printed but also aids in visual accessibility for correction of any problems which develop in the feeding of the paper.

The bar 10 is provided with thin rubber pads 20 for purposes of damping vibration and holding the printer against movement. Rubber pads 22 are also provided for the contact surfaces of feet 16 of each of the stanchions 12 and 14 to secure the printer stand and to avoid marking of the surface upon which the printer stand is resting. The rubber pads 22 are indicated in FIG. 6.

Figure 6:
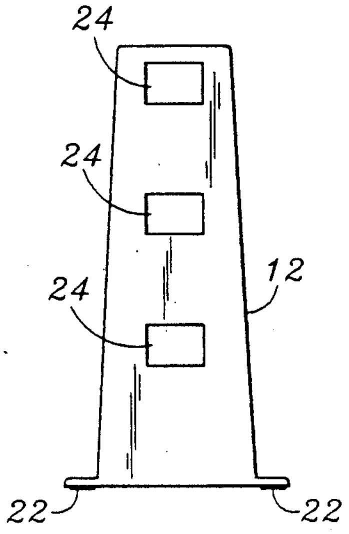
FIG. 6 shows the taller of the stanchions upon which the upright support members and support arms are attached for support of the paper catch tray.

As shown in FIG. 6 the stanchion 12 of greater height is provided with three apertures 24. These apertures are designed to receive hooked tab members 26 and 28 attached to upright support members 36 and 44 which support arms 30 and 32 respectively. This arrangement provides cantilevered support of the arms 30 and 32 extending from stanchions 12.

The main printer support surfaces 11 on bars 10 are symmetrical and interchangeable. The top surface 11 of the bar 10 is provided with ribs 34 to avoid slippage of the printer.

The support arm 30 includes an upright member 36 which gives support to the arm 30. The arm 30 includes an angled member 38 which extends from the upright member 36 and terminates in a raised beam 40. The raised beam 40 has a top rail 41 which is provided with a side opening slot 42. The support arm 30, upright member 36, angled member 38 and raised beam 40 are of open channel form.

Similarly support arm 32 includes an upright member 44. The support arm 32 includes an angled member 46 which extends from the upright member 44 and terminates in a raised beam 48 which has a top rail 49 with a side opening slot 50. The arm 32, upright member 44, angled member 46 and raised beam 48 are of open channel form.

The angled members 38 and 46 place the support arms 30 and 32 at an optimum position for support of a paper tray 70.

Figure 9:
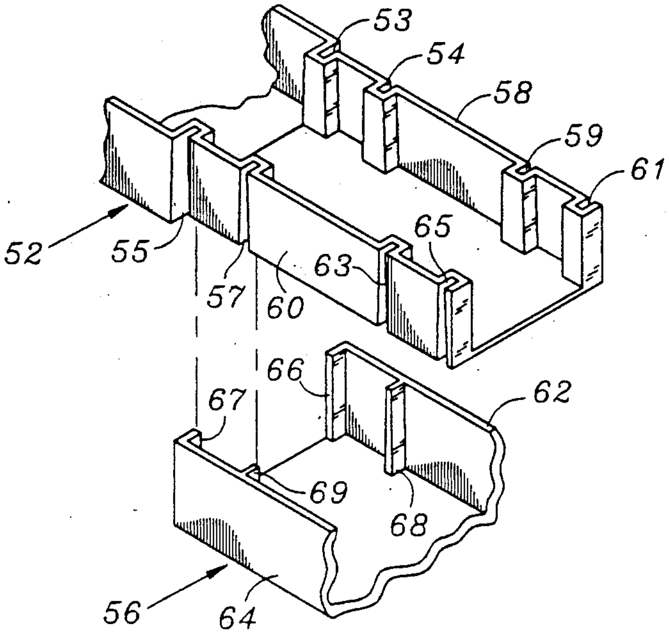
FIG. 9 shows an enlarged broken away perspective view of the underside of the interlocking cross members.
Figure 10A:
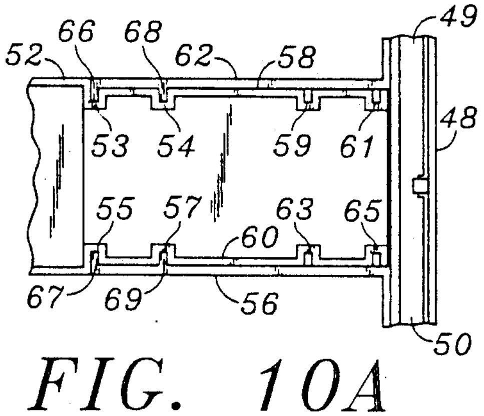
FIG. 10*a* shows the underside of cross members of FIG. 9 in one interlocking position.
Figure 10B:
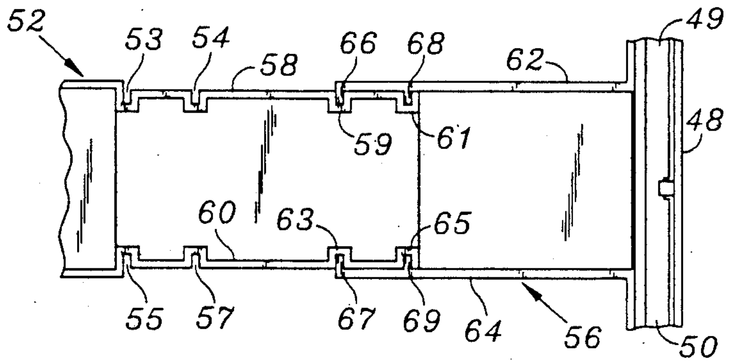
FIG. 10*b* shows the underside of cross members of FIG. 9 in another interlocking position.

As detailed in FIGS. 9, 10*a* and 10*b*, the raised beam 40 of support arm 38 has a cross member 52 which is provided with two downwardly extending opposed parallel edges 58 and 60. Edge 58 is provided with two pairs of parallel spaced apart channels 53, 54, and 59, 61. Edge 60 is provided with two pairs of parallel spaced apart channels 55, 57 and 63, 65. Each individual channel 53, 54, 55, 57, 59, 61, 63 and 65 is tapered slightly.

Channel pair 53, 54 on edge 58 is diametrically opposed to channel pair 55, 57 on edge 60. Similarly, channel pair 59, 61 on edge 58 is diametrically opposed to channel pair 63, 65.

Support arm 32 has a cross member 56 attached thereto. Cross member 56 is provided with two downwardly extending opposed parallel edges 62 and 64. Edge 62 of cross member 56 terminates at one end in an inwardly extending flange 66. Spaced from inwardly extending flange 66 is another inwardly extending flange 68. Edge 64 of cross member 56 terminates at one end in an inwardly extending flange 67. Spaced from inwardly extending flange 67 and parallel thereto is another interior inwardly extending flange 69.

Flange 66 and 68 on edge 62 are diametrically opposed to flange 67 and 69 on edge 64. The opposed pairs of flanges 66, 68 and 67, 69 are adapted for slidably engaging pairs of channels 53, 54 and 55, 57 or for engaging channels 59, 61 and 63, 65 of cross member 52. Flanges 68 and 69 are tapered and sized to snugly engage one of the tapered channels 53, 54, 55, 57, 59, 61, 63 and 65.

It can be seen that channel pair 59, 61 which is diametrically opposite to channel pair 63, 65 are located near the end of cross member 52. The channel pair 53, 54 which is diametrically opposite to channel pair 55, 57 is spaced from the end of cross member 52.

When channel pairs 59, 61 and 63, 65 of cross member 52 are engaged by flanges 66, 68 and 67, 69 of cross member 56 as shown in FIG. 10*b*, a wide width printer can be supported. Similarly, when a smaller width printer is to be supported, the edge flanges 66, 68 and 67, 69 of cross member 56 engage a more centrally located pair of diametrically opposed channels 53, 54 and 55, 57 as shown in FIG. 10*a*.

By such engagement the width between the raised beams 40 and 48 can be varied between two different widths depending on the pairs of diametrically opposed channels 53, 54 and 55, 57 or 59, 61 and 63, 65 which are engaged by edge flanges 66, 68 and 67, 69. This provision thereby allows variable width spacing of rails 41 and 49.

Figure 4:
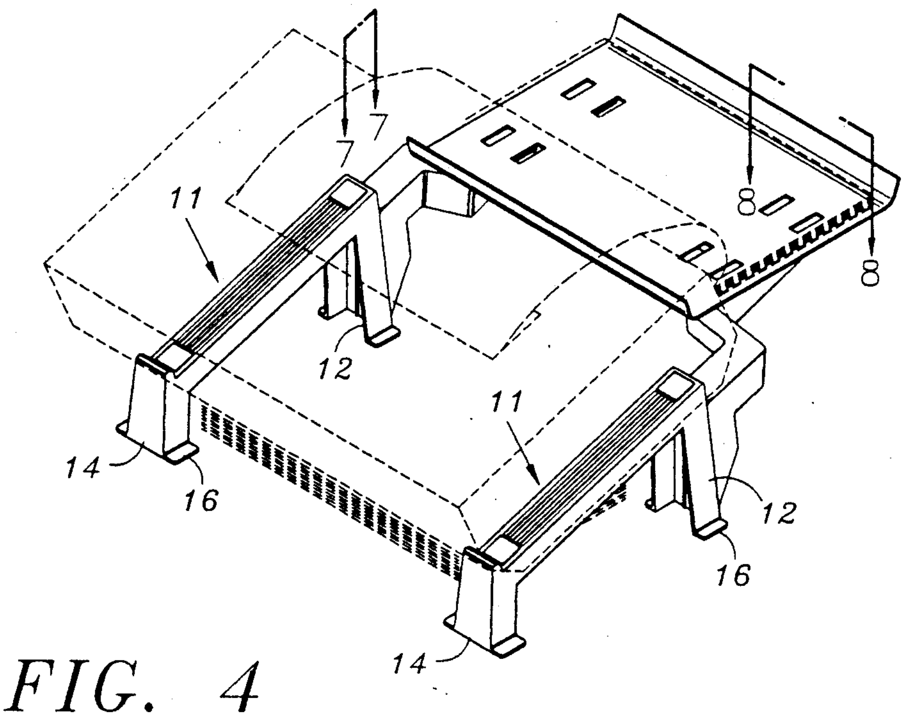
FIG. 4 shows the printer stand of the invention from a perspective view with outlining for a printer to indicate the location of feed paper and an accumulation of paper in the paper catch tray.

As shown in FIGS. 1, 2 and 4, the printer catch tray 70 has two opposed parallel upwardly extending edges 72 and 74 for holding the paper output of a printer.

Figure 5:
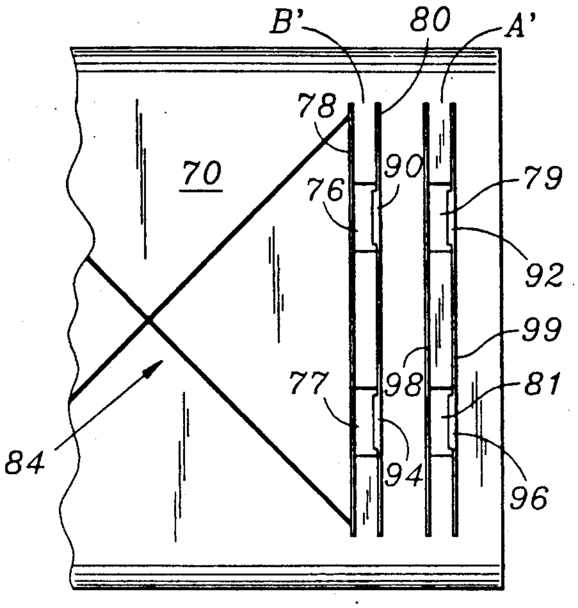
FIG. 5 shows a partially broken away plan view of the underside of the paper catch tray.
Figure 8:
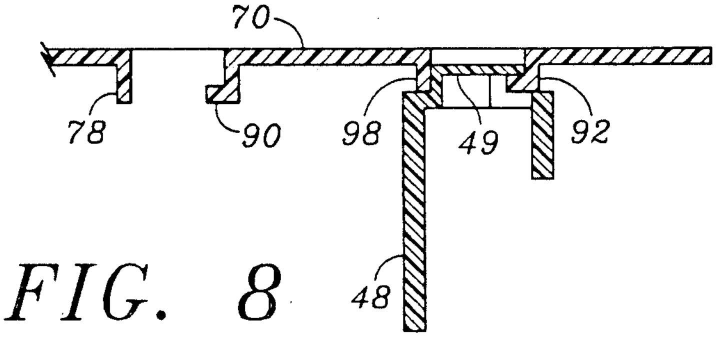
FIG. 8 shows a section taken in the direction of lines 8—8 of FIG. 4 which shows the paper catch tray interlocking with the support arm.

The tray 70 is provided with aligned rectangular openings 76, 77, 79, 81, 83, 85, 87, 89. As shown in FIGS. 5 and 8 the openings 76 and 77 are located between projecting rims 78 and 80 on the underside of the tray 70. Openings 79 and 81 are located between projecting rims 98 and 99 on the other side of the tray 70 as shown in FIG. 5. The rims 78 and 80, 98 and 99 are spaced apart and parallel to each other.

Projecting rim 80 is provided with an inwardly turned lip 90 which extends within opening 76 and an inwardly turned lip 94 which extends within opening 77. Similarly, projecting rim 99 is provided with an inwardly turned lip 92 which extends within opening 79 and an inwardly turned lip 96 which extends within opening 81.

The inwardly turned lips 90 and 94 or 92 and 96 are adapted to engage side opening slot 50 of rail 49. Since the tray 70 is symmetrical, there are corresponding spaced apart parallel rims, not shown, within which openings 76, 77 and 79, 81 are disposed. Similar inwardly turned lips not shown which extend within openings 76, 77, and 79, 81 are adapted to engage the side opening slot 42 of rail 41 on support arm 30.

The tray 70 is thus slid over the slotted edges of the rails 41 and 49 of raised beams 40 and 48 to engage the underside of the rails 41 and 49 through the slots 42 and 50. This is shown in greater detail in FIG. 8.

Two symmetrical pairs of spaced apart projecting rims are located on either side of tray 70. The purpose is to provide for different widths of printers and printer paper. Thus, when cross member 56 is made to engage cross member 52 so that flanges 66, 68 engage channels 59, 61 and flanges 67, 69 engage channels 63, 65, then the rails 41, 49 of raised beams 40 and 48 will engage inwardly turned lips within openings 76, 77 and 87, 89 on printer catch tray 70. In this position the widest dimension is achieved by the cross members 52 and 56.

Similarly when cross member 56 is made to engage cross member 52 so that flanges 66, 68 engage channels 53, 54 and flanges 67, 69 engage channels 55, 57 as shown in FIG. 10*a*, the printer stand is at its narrowest width and will engage the printer tray 70 by means of the rails 41 and 49 of the raised beams 40 and 42 by sliding over inwardly turned lips within openings 79, 81 and 83, 85. Other variable widths can be accommodated by a greater plurality and spacing of the adjusting portions of this invention.

The underside of the tray 70 includes a raised reinforcing X-shaped member 84 which provides extra strength to paper catch tray 70 so that large loads of paper can be held by the paper catch tray 70.

The strength of the printer stand is particularly made possible by means of the cantilevered attachment of the arms 30 and 32 to stanchions 12 connected to the bars 10. The weight of the printer on the support bars 10 counter balances the weight of the paper held in the printer catch tray 70 which is supported by means of the support arms 30 and 32.

The hooked tabs 26 on upright support member 36 and hookd tabs 28 on upright support 44 slidably engage the edge formed within apertures 24 of stanchion 12. The printer catch tray 70 can be height adjusted to two different heights. By placing the tabs 26 and 28 in the upper apertures 24 of stanchions 12 and 14, the tray 70 is at its highest height. By placing the tabs 28 within the two lower apertures 24 of stanchions 12 and 14, the tray 70 is at its lowest height. Here again, variable adjustment can be accommodated by multiple apertures and tabs.

Figure 7A:
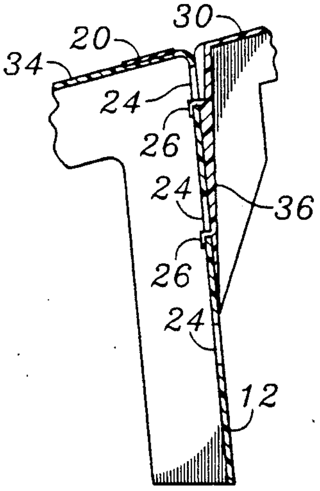
FIG. 7*a* is a section taken generally along lines 7—7 of FIG. 4 which shows the engagement of the tab members within two apertures of the taller stanchion in one position.
Figure 7B:
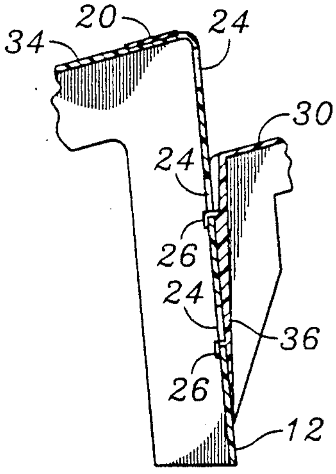
FIG. 7*b* shows the same showing as FIG. 7*a* with the tab members inserted in a lower pair of apertures.

The upper position just described is shown in detail in the section of FIG. 7*a* and the lower position is shown in the section of FIG. 7*b*.

The bars and stanchions of this invention, as well as the arms, and bars with their various portions are preferably injection molded from a single piece of plastic. The cross section is formed as a channel for attendant strength. The channel can be a box channel or other configuration with the outer portions removed from the neutral axis such as an I beam, L beam, tubular member, angle beam or any other structured cross section.

Various modifications of the invention described above are contemplated and can be resorted to without departing from the spirit and scope of the invention. For example, while plastic is a preferred material, other materials including metals can also be used. Thus, this invention should be read broadly in light of the following claims.

We claim:

1. A printer stand for support of a printer comprising:

a base member for support of a printer which is comprised of a pair of spaced apart parallel bars, wherein each bar has two ends, each end being supported by a stanchion which raises the bars sufficiently to provide a space beneath the bars for storage of printer paper;

at least one of said stanchions of each of said bars has means for detachable receipt of one of a pair of cantilever support arms which are comprised of a first cantilever arm and a second cantilever arm, said first cantilever arm having an upright support member with means for detachable securement to said stanchion and means for detachable securement to a paper tray; said second cantilever arm having an upright support member with means for detachable securement to said stanchion and means for detachable securement to a tray for receipt of paper from a printer; and, wherein said cantilever arms further comprise at least one cross member for bracing said cantilever arms at a point away from said connection of said cantilever arms to said stanchion.

2. A printer stand as claimed in claim 1 wherein said first cantilever arm has a first cross member and said second cantilever arm has a second cross member, said first cross member having means for detachably securing to said second cross member and said second cross member having means for detachably securing to said first cross member so that when joined, said first and second cross members act as a brace for said first and said second cantilever arms and for said parallel bars.

3. A printer stand as claimed in claim 2 wherein said first and said second cross members have width adjustment means associated with said means for detachably securing said first and second cross members together whereby the width between said first and second cross members can be adjusted.

4. A printer stand as claimed in claim 2 wherein said printer stand can be assembled and disassembled by hand.

5. A printer stand as claimed in claim 1 wherein said means for detachable receipt of one of said support arms on at least one of said stanchions of each of said bars has associated means for height adjustment whereby the height of each said support arm can be height adjusted for height adjustment of said paper tray.

6. A printer stand as claimed in claim 5 wherein said means for detachable receipt of said support arm on said stanchion is comprised of a plurality of apertures within said stanchion and wherein said means for detachable securement on said support arm is comprised of at least one hooked tab adapted to slidably engage at least one aperture of said stanchion.

7. A printer stand as claimed in claim 1 wherein said tray has means for detachable securement to said support arms and wherein said support arms have means for detachable securement to said tray.

8. A printer stand as claimed in claim 7 wherein said means on said tray for detachable securement to said support arms has associated means for receipt of differing widths of said support arms.

9. A printer stand as claimed in claim 7 wherein said means on said support arms for detachable securement to said tray comprises a raised beam having a rail with a side opening slot and wherein said means on said tray for detachable securement to said support arm comprises two or more pairs of spaced apart parallel projecting rims defining a space between them, one of said projecting rims having at least one inwardly turned lip adapted for engaging said side opening slot of said rail.

10. A printer stand as claimed in claim 9 further comprising at least one opening within said space between said projecting rims of said tray and wherein said inwardly turned lip is limited to the vicinity of said openings to facilitate engagement of said inwardly turned lip by said side opening slot.

11. A printer stand comprising:

a pair of spaced apart independent base members, each member supporting a cantilever arm, each cantilever arm being braced by at least one cross member which is disposed between each said cantilever arm at a point away from said base member support, and a paper catch tray supported by said cantilever arms and cross members, and wherein said base members, arms, and cross members are of open channel form.

12. A printer stand as claimed in claim 11 wherein said printer stand is comprised of a plastic material.

* * * * *